United States Patent [19]
Shives

[11] Patent Number: 5,924,616
[45] Date of Patent: *Jul. 20, 1999

[54] STORAGE BOX FOR STORING CARGO IN A PICK-UP TRUCK

[76] Inventor: Mark E. Shives, 346 Bangor Dr., Indianapolis, Ind. 46227

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,971

[22] Filed: Apr. 11, 1997

[51] Int. Cl.$^6$ ............................... B60R 11/06; B60R 9/00
[52] U.S. Cl. ........................... 224/404; 224/281; 296/37.6
[58] Field of Search ................................... 224/404, 321, 224/281, 400, 401, 545, 548, 554; 296/37.6; D12/409, 410, 412, 413, 423

[56] References Cited

U.S. PATENT DOCUMENTS

| | | | |
|---|---|---|---|
| 4,564,167 | 1/1986 | Smith | 224/404 |
| 4,635,992 | 1/1987 | Hamilton et al. | 296/37.6 |
| 4,681,360 | 7/1987 | Peters et al. | 296/37.6 |
| 4,752,095 | 6/1988 | Brady | 224/404 |
| 4,824,158 | 4/1989 | Peters et al. | 296/37.6 |
| 4,946,215 | 8/1990 | Taylor | 224/404 |
| 5,037,153 | 8/1991 | Stark | 224/404 |
| 5,088,636 | 2/1992 | Barajas | 296/37.6 |
| 5,121,959 | 6/1992 | King | 224/404 |
| 5,186,510 | 2/1993 | Stapp | 224/404 |
| 5,232,138 | 8/1993 | Cucheran | 224/321 |
| 5,368,210 | 11/1994 | Wotring | 224/404 |
| 5,460,304 | 10/1995 | Porter et al. | 224/527 |
| 5,484,092 | 1/1996 | Cheney | 224/404 |
| 5,509,764 | 4/1996 | Shives . | |
| 5,588,631 | 12/1996 | Yee | 224/404 |
| 5,642,845 | 7/1997 | Van Kooten | 224/404 |
| 5,704,524 | 1/1998 | Stapleton | 224/321 |
| 5,762,244 | 6/1998 | Wagner et al. | 224/281 |

FOREIGN PATENT DOCUMENTS

| | | | |
|---|---|---|---|
| 2030143 | 5/1992 | Canada | 224/404 |

Primary Examiner—Gregory M. Vidovich
Attorney, Agent, or Firm—Armstrong Teasdale LLP

[57] ABSTRACT

Cargo storage boxes for storing cargo in a pick-up truck are described. The pick-up truck includes a cargo bed having a cargo surface, and first and second walls extend substantially perpendicularly from opposite sides of the cargo surface. The first and second cargo bed walls extend substantially the same distance from the cargo surface, and tops of the cargo bed walls are substantially co-planar. The cargo storage box, in accordance with one embodiment of the present invention, is sized to be positioned between the first and second cargo bed walls, and includes a base wall and retaining walls extending perpendicularly from the base wall to define a cargo chamber. The retaining walls each extend substantially the same distance from the base wall, and top surfaces of the retaining walls are substantially co-planar. The distance between the base wall and the top of each retaining wall is less than the distance between the cargo surface and top surfaces of the cargo bed walls. A first locking element is configured to releasably secure a first one of the retaining walls to the first cargo bed wall. A second element is configured to releasably secure a second and opposite one of the retaining walls to the second cargo bed wall.

13 Claims, 3 Drawing Sheets

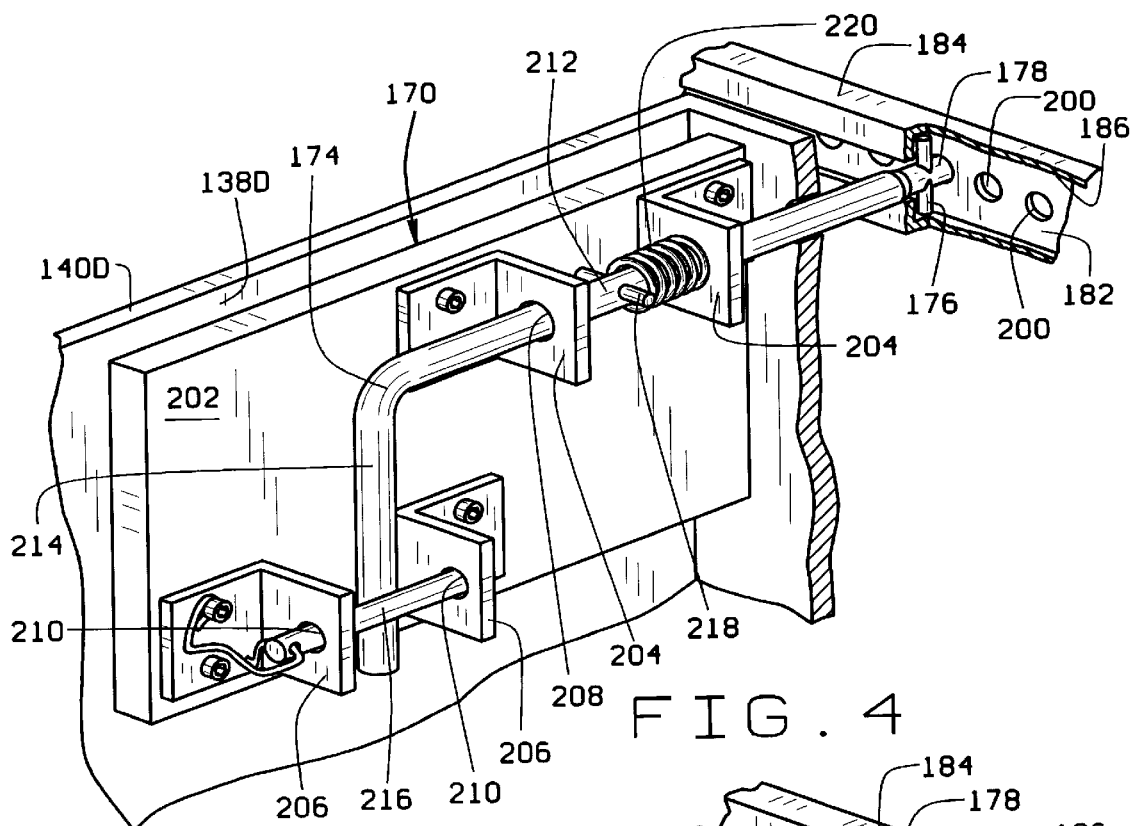
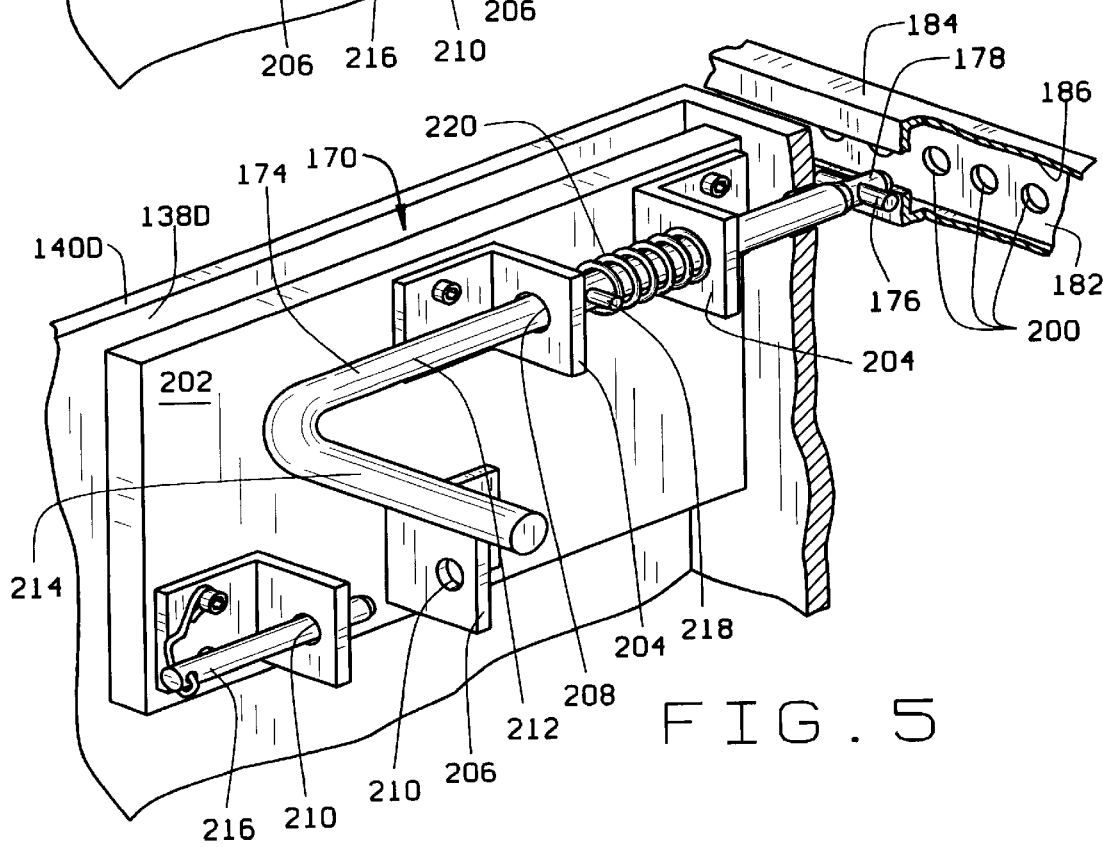

STORAGE BOX FOR STORING CARGO IN A PICK-UP TRUCK

FIELD OF THE INVENTION

This invention relates generally to portable cargo storage boxes such as tool boxes and, more particularly, to assemblies and apparatus for securing a cargo storage box in the bed of a truck such as a pick-up truck.

BACKGROUND OF THE INVENTION

Known pick-up trucks typically include a cargo bed for storing objects, e.g., cargo, during transportation. The cargo bed includes a substantially rectangular horizontal floor and substantially vertical walls extended from the edges of the floor. Particularly, stationary walls form the front wall and two adjacent side walls, and a removable or hinged tail gate forms the back wall and provides access to the bed floor for cargo loading and unloading. The walls are approximately between one and three feet high and facilitate retaining cargo within the cargo bed.

The cargo bed often is utilized to transport a cargo storage box such as a tool box. One known cargo bed tool box is substantially T-shaped and configured to rest on top of the vertical walls of the cargo bed. Particularly, the tool box includes a substantially hollow central portion and two lips extending from opposite sides of the central portion. The central portion is configured to retain tools, i.e., hammers, wrenches, and screwdrivers, and the lips are configured to be frictionally coupled to the tops of the respective side walls. To install the tool box in the cargo bed, the lips are placed on the tops of the respective side walls so that the central portion of the tool box extends downwardly into the cargo bed. The tool box is substantially easy to install and remove from the cargo bed of the pick-up truck. However, such tool box also is highly visible from side views because the lips of the tool box extend across the top of the cargo bed. Such high visibility is believed to increase the likelihood of theft of the tools retained within the tool box and, sometimes, the tool box itself.

To reduce the likelihood of theft, some pick-up truck tool boxes are permanently installed in cargo beds. However, such permanently installed tool boxes limit the amount of cargo bed space available for transporting other cargo. In addition, such permanently installed tool boxes typically are difficult to remove from the cargo bed, which may be desirable, for example, when unloading the truck at a remote work site. In addition, such tool boxes typically extend across the top of the cargo bed wall, and thus remain visible to potential thieves.

It would be desirable to provide a tool box for the cargo bed of a pick-up truck which does not extend above the walls of the cargo bed. It also would be desirable for such tool box to be easy to install and remove from the cargo bed. It further would be desirable for such tool box to be securable at different locations within the cargo bed.

SUMMARY OF THE INVENTION

These and other objects may be attained by a cargo storage box which, in one embodiment, is configured to be releasably secured in the cargo bed of a pick-up truck so that the cargo storage box does not extend above the top of the cargo bed. The cargo bed includes a cargo surface, and first and second walls extend substantially perpendicularly from opposite sides of the cargo surface. The first and second cargo bed walls extend substantially the same distance from the cargo surface, and tops of the cargo bed walls are substantially co-planar.

The cargo storage box, in accordance with one embodiment of the present invention, is sized to be positioned between the first and second cargo bed walls, and includes a base wall and retaining walls extending perpendicularly from the base wall to define a cargo chamber sized to receive, for example, tools. The retaining walls each extend substantially the same distance from the base wall, and top surfaces of the retaining walls are substantially co-planar. The distance between the base wall and the top of each retaining wall is less than the distance between the cargo surface and top surfaces of the cargo bed walls.

The cargo storage box further includes a first locking element and a second locking element. The first locking element is configured to releasably secure a first one of the retaining walls to the first cargo bed wall. The second locking element is configured to releasably secure a second and opposite one of the retaining walls to the second cargo bed wall.

In operation, the cargo storage box is positioned in the cargo bed between the first and second walls of the cargo bed so that the base wall is adjacent the cargo surface and so that the top surfaces of the cargo storage box retaining walls are below the top surfaces of the cargo bed side walls. The first locking element then secures the first retaining wall to the first cargo bed wall and the second locking element secures the second retaining wall to the second cargo bed wall.

The above described cargo storage box may be secured to a cargo bed of a pick-up truck without extending above the walls of the cargo bed. Such cargo storage box also is believed to be easy to install and remove from the cargo bed. In addition, such cargo storage box is securable at different locations within the cargo bed.

BRIEF DESCRIPTION OF THE DRAWINGS

FIG. 4 is an exploded partial perspective view, with parts cut away, of the locking element shown in FIG. 2 in a locked position.

FIG. 5 is an exploded partial perspective view, with parts cut away, of the locking element shown in FIG. 2 in an unlocked position.

DETAILED DESCRIPTION

Figure 1:
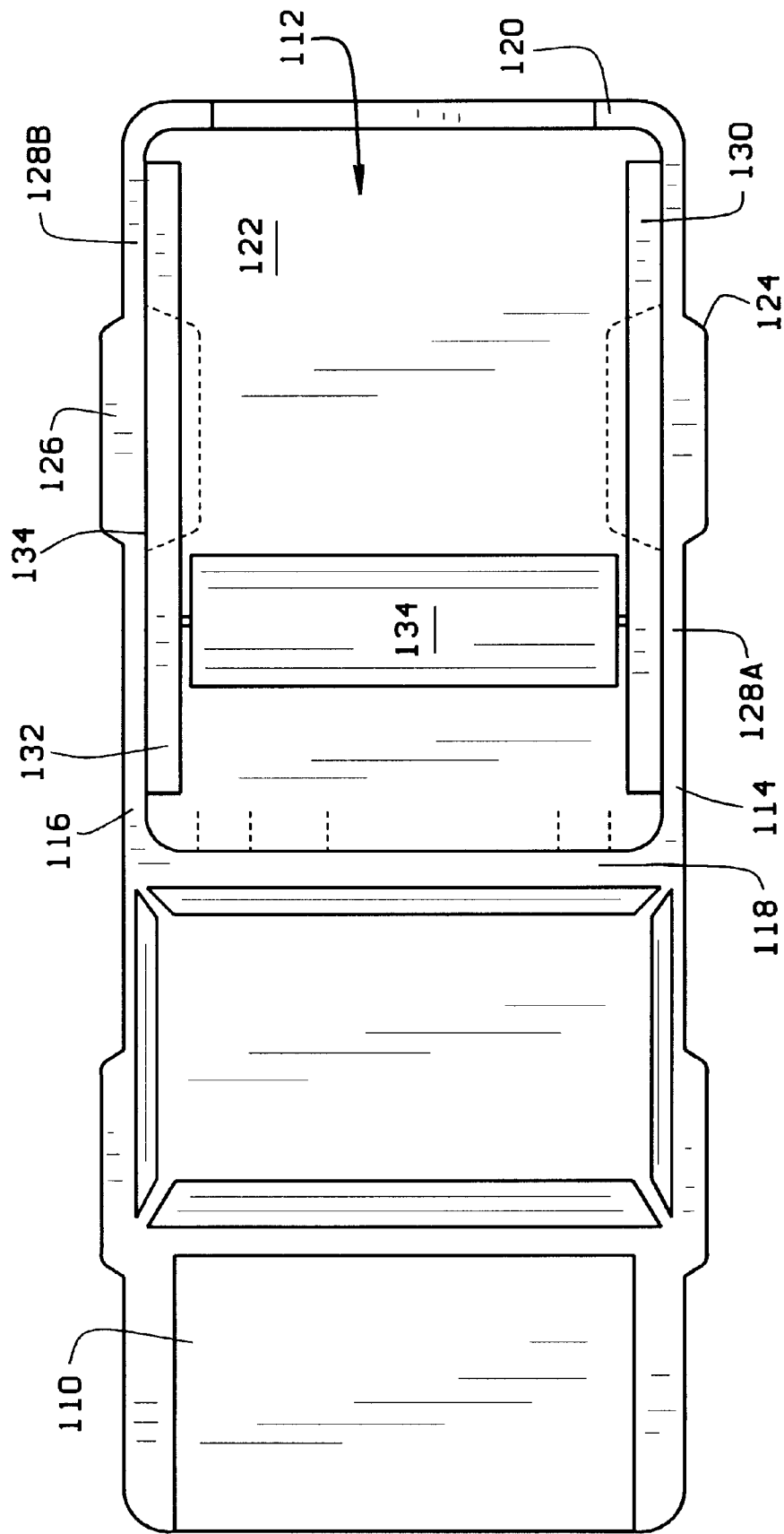
FIG. 1 is a top view illustration of a pick-up truck having a cargo storage box in accordance with the present invention installed in a bed of the pick-up truck.

FIG. 1 is a top view illustration of a pick-up truck 110 having a cargo bed portion 112 including a first side bed wall 114, a second side bed wall 116, a forward wall 118, a tailgate 120, and a floor 122. First side bed wall 114 includes a first wheel well 124 and second side bed wall 116 includes a second wheel well 126. Side bed walls 114 and 116 extend substantially a same distance from floor 122 and top surfaces 128A and 128B of side bed walls 114 and 116, respectively, are substantially co-planar.

A first slide rail 130 is mounted to first side bed wall 114, and a second slide rail 132 is mounted to second side bed wall 116. First slide rail 130 is substantially parallel and opposite second slide rail 132. First and second slide rails 130 and 132 are permanently mounted to first and second side bed walls 114 and 116, respectively, with securing elements such as, for example, bolts (not shown). Alternatively, slide rails 130 and 132 may be supported adjacent respective side bed walls 114 and 116, respectively, utilizing a support rack (not shown) standing on floor 122 of cargo bed portion 112.

A cargo storage box 134, such as a tool box, is positioned in cargo bed portion 112 between first and second side bed walls 114 and 116. Cargo storage box 134 is slidably coupled to each side bed wall 114 and 116, and is configured to slide between a position substantially adjacent forward wall 118 and a position substantially adjacent tail gate 120. Particularly, cargo storage box 134 is slidably coupled to first and second slide rails 130 and 132.

Figure 2:
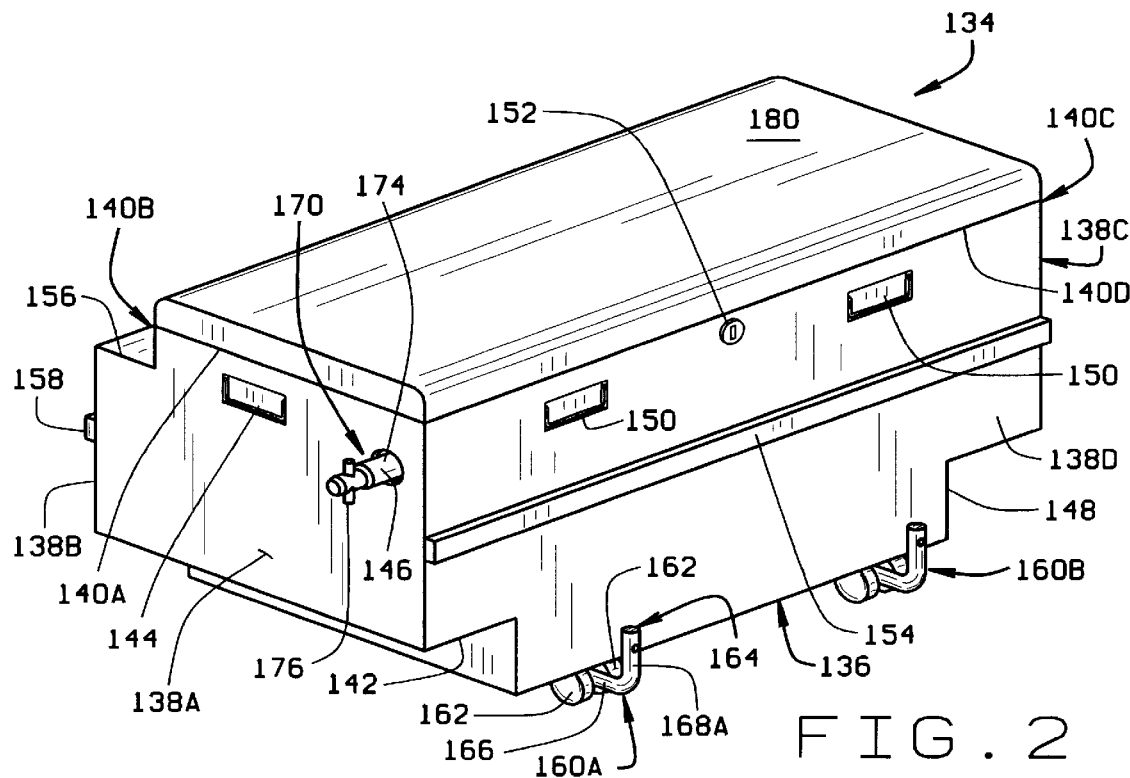
FIG. 2 is a perspective view illustration of the cargo storage box shown in FIG. 1.

FIG. 2 is a perspective view illustration of cargo storage box 134 which includes a substantially rectangular base wall 136. Four retaining walls 138A, 138B, 138C, and 138D extend substantially perpendicularly from base wall 136 to define a cargo chamber (not shown). Each retaining wall 138A, 138B, 138C, and 138D includes a respective top surface 140A, 140B, 140C, and 140D, and top surfaces 140A, 140B, 140C, and 140D are substantially co-planar. Retaining walls 138A, 138B, 138C, and 138D each are sized so that a distance between base wall 136 and each top surface 140A, 140B, 140C, and 140D, respectively, is not greater than a distance between cargo bed floor 122 and top surfaces 128A and 128B of respective cargo side bed walls 114 and 116. Particularly, retaining walls 138A, 138B, 138C, and 138D each are sized so that the distance between base wall 136 and each top surface 140A, 140B, 140C, and 140D, respectively, is less than the distance between cargo bed floor 122 and top surfaces 128A and 128B of respective cargo side bed walls 114 and 116.

Retaining wall 138A, or the first side retaining wall, includes a wheel well pass through channel 142, a side handle 144 and a locking element opening 146. Similarly, retaining wall 138C, or the second side retaining wall, includes a wheel well pass through channel 148, a side handle (not shown) and a locking element opening (not shown).

Retaining wall 138D, or the rear retaining wall, includes two handles 150 and a cargo storage box lock 152. A first bumper 154 is coupled to rear retaining wall 138D and extends between first and second side retaining walls 138A and 138C, respectively. Retaining wall 138B, or the front retaining wall, includes a cab pass through channel 156 sized to engage a lip (not shown) adjacent forward wall 118 of cargo bed 112. A second bumper 158 is coupled to front retaining wall 138B and extends between first and second side retaining walls 138A and 138C, respectively.

Cargo storage box 134 further includes first and second rolling elements 160A and 160B, respectively. First rolling element 160A includes wheels 162 coupled to a rod 164. Rod 164 is substantially U shaped and includes a back portion 166 having two leg portions, one of which is shown as 168A in FIG. 2 extending from one end of back portion 166, and the second one of which extends from the other end thereof. Rod 164 is sized to receive base wall 136 of cargo storage box 134, and leg portion 168A extends adjacent rear retaining wall 138D and the second leg portion extends adjacent front retaining wall 138B. One set of wheels 162 is coupled to back portion 166 of rod 164 adjacent leg portion 168A and another set of wheels 162 is coupled to back portion 166 of rod 164 adjacent the second leg portion (only the set of wheels 162 adjacent leg portion 168A is shown in FIG. 2). Second rolling element 160B is constructed the same as first rolling element 160A, and is positioned substantially parallel to first rolling element 160A.

Cargo storage box 134 further includes a first locking element 170 and a second locking element 172 (only first locking element 170 is shown in FIG. 2). First locking element 170 is coupled to rear retaining wall 138D and includes a locking arm 174 which extends through locking element opening 146 to releasably secure first side retaining wall 138A to first side bed wall 114. Particularly, a pin element 176 extends substantially transversely through locking arm 174 adjacent an outer end 178 of locking arm 174. Pin element 176 is configured to be positioned in first slide rail 130 and substantially secure first side retaining wall 138A to first side slide rail 130. Second locking element 172 also is coupled to rear retaining wall 138D and includes a locking arm which extends through the locking element opening in second side retaining wall 138C to releasably secure second side retaining wall 138C to second side bed wall 116. Particularly, second locking element 172 includes a pin element (not shown in FIG. 2) which extends through an outer end of the locking arm to secure second side retaining wall 138C to second slide rail 132.

Cargo storage box 134 also includes a lid 180 for covering the cargo chamber. Lid 180 is hingedly coupled to top surface 140B of front retaining wall 138B and is rotatable between a closed position, where lid 180 is substantially parallel to base wall 136, and an open position, where lid 180 is not substantially parallel to base wall 136. Lid 180 is configured to be locked in the closed position by cargo storage box lock 152.

Figure 3:
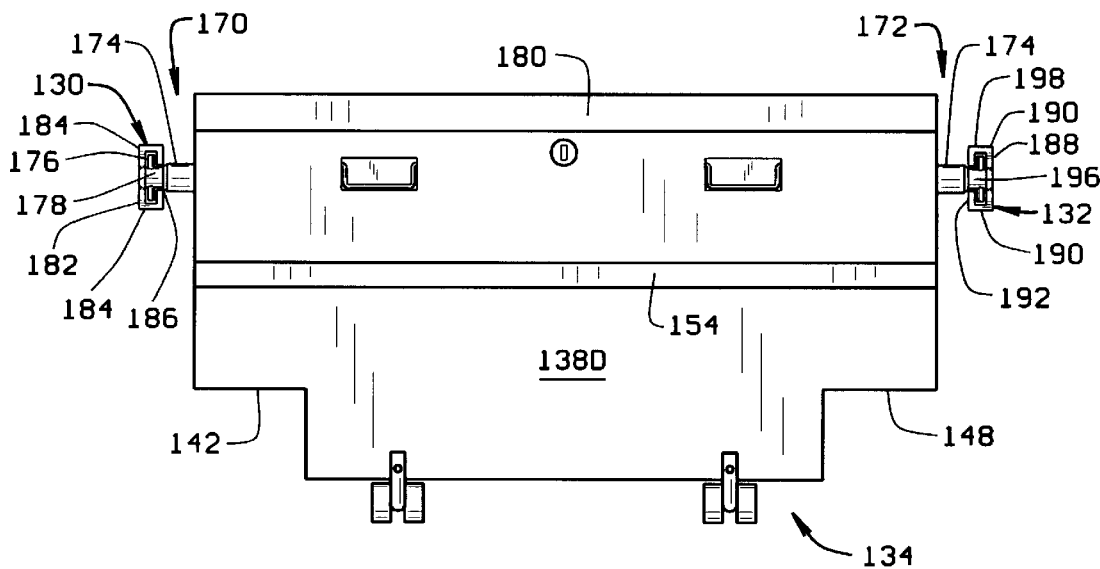
FIG. 3 is a front view illustration of the cargo storage box shown in FIG. 2.

FIG. 3 is a front view illustration of cargo storage box 134 coupled to first and second slide rails 130 and 132, respectively. First slide rail 130 is substantially C shaped and includes a base wall 182 and side walls 184. Side walls 184 extend from base wall 182 to define a first sliding channel 186. Second slide rail 132 also is substantially C shaped and includes a base wall 188 and side walls 190. Side walls 190 extend from base wall 188 to define a second sliding channel 192 which is substantially parallel to first sliding channel 186.

Locking arm 174 of first locking element 170 is positioned so that outer end 178 couples to base wall 182 of first slide rail 130 and pin element 176 extends between side walls 184 within first sliding channel 186. Particularly, outer end 178 of locking arm 174 extends at least partially within an opening (not shown in FIG. 3) in base wall 182 of first slide rail 130. Similarly, a locking arm 194 of second locking element 172 is positioned so that an outer end 196 of locking arm 194 couples to base wall 188 of second slide rail 132 and pin element 198 extends between side walls 190 within second sliding channel 192. Particularly, outer end 196 of locking arm 194 extends at least partially within an opening (not shown in FIG. 3) in base wall 188 of second sliding rail 132.

FIG. 4 is an exploded partial perspective view, with parts cut away, of first locking element 170 in a locked position. As shown more clearly, first slide rail base wall 182 includes several openings 200 which are sized to receive outer end 178 of locking arm 174. Second rail base wall 188 also includes several openings (not shown) which are substantially aligned with openings 200.

Locking arm 174 is movably coupled to a base plate 202, which is coupled to rear retaining wall 138D. More particularly, locking arm 174 is rotatably and slidably coupled to base plate 202. Base plate 202 includes a first pair of brackets 204 and a second pair of brackets 206. Each bracket of first pair of brackets 204 includes an opening 208 (only one opening 208 is shown in FIG. 4) and brackets 204 are positioned so that openings 208 are substantially aligned. Similarly, second pair of brackets 206 are positioned so that openings 210 in each bracket 206 are substantially aligned.

Locking arm 174 is substantially L shaped and one portion 212 of locking arm 174 extends through openings 208 in first pair of brackets 204. A second portion 214 of arm 174 extends substantially perpendicularly from first portion 212, and is substantially parallel to pin element 176. In the locked position, second portion 214 is substantially adjacent base plate 202 and extends between second pair of brackets 206. In addition, pin element 176 extends substantially vertically between side walls 184 of first slide rail 130. A locking pin 216 extends through bracket openings 210 to substantially secure locking arm 174 in the locked position.

A pin 218 and spring 220 facilitate securing pin element 176 within channel 186 when first locking element 170 is in the locked position. Pin 218 extends through second portion 214 of arm 174 between first pair of brackets 204. Spring 220 is coupled at one end to pin 218 and at its other end to one of brackets 204 so that spring 220 is substantially compressed when first locking element 170 is in the locked position.

FIG. 5 is an exploded partial perspective view, with parts cut away, of first locking element 170 in an unlocked position. In the unlocked position, second portion 214 of locking arm 174 is substantially perpendicular to base plate 202, and pin element 176 extends substantially horizontally to facilitate removing locking arm 174 and pin element 176 from first sliding channel 186 of first slide rail 130. In addition, spring 220 is substantially extended when first locking element 170 is in the unlocked position.

Second locking element 172 is configured in the same manner as first locking element 170. Particularly, locking arm 194 of second locking element 172 is rotatably and slidably coupled to a base plate, and locking arm 194 is configured to move between a locked position with respect to second slide rail 132 and an unlocked position with respect to second slide rail 132.

In operation, rolling elements 160A and 160B are positioned on floor 122 of cargo bed portion 112. Cargo storage box 134 is positioned on rolling elements 160A and 160B so that base wall 136 of cargo storage box 134 is substantially adjacent and parallel to floor 122, and so that first side retaining wall 138A is adjacent first side bed wall 114 and second side retaining wall 138C is adjacent second side bed wall 116. Cargo storage box 134 may then be moved on rolling elements 160A and 160B to any position between forward bed wall 118 and tail gate 120. Wheel well pass through channels 142 and 148 enable cargo storage box 134 to be moved over wheel wells 124 and 126, respectively. Particularly, wheel well pass through channels 142 and 148 are sized so that wheel wells 124 and 126, respectively, pass through channels 142 and 148 when cargo storage box 132 is moved between forward bed wall 118 and tail gate 120.

After positioning cargo storage box 134 in cargo bed portion 112, locking arm 174 of first locking element 170 is extended through locking element opening 146 and into first sliding channel 186 of first slide rail 130. Particularly, locking arm 174 is extended so that outer portion 178 at least partially extends through one of openings 200 in first slide rail base wall 182. Similarly, locking arm 194 of second locking element 172 is extended through the locking element opening of second side retaining wall 138C and into second sliding channel 192 of second slide rail 132 so that outer portion 196 extends at least partially through an opening in second slide rail base wall 188 which is substantially aligned with opening 200. Locking arms 174 and 194 then are each rotated so that pin elements 176 and 198, respectively, extend substantially vertically between respective side walls 184 and 190.

The above described cargo storage box may be secured to a cargo bed of a pick-up truck without extending above the walls of the cargo bed. Such cargo storage box also is believed to be easy to install and remove from the cargo bed. In addition, such cargo storage box is securable at different locations within the cargo bed.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A cargo storage box for a cargo bed of a pick-up truck, the cargo bed including a support surface, a first bed wall, and second bed wall, the first bed wall substantially parallel to the second bed wall, the first and second bed walls extending substantially perpendicularly from the cargo bed support surface and having substantially co-planar top surfaces, said cargo storage box configured to be positioned between the first and second bed walls, said cargo storage box comprising:

a base wall;

a plurality of retaining walls extending from said base wall to define a cargo chamber, each of said retaining walls having a top surface, each of said retaining walls sized so that a distance between said base wall and said retaining wall top surface is not greater than a distance between the cargo support surface and the top surfaces of the first and second cargo bed walls; and at least one locking element movably coupled to one of said retaining walls and configured to releasably secure at least one of said retaining walls to a slide rail positioned on one of the first and second bed walls, said locking element comprising an arm portion having an outer end with a transverse member such that said outer end is substantially t-shaped, said outer end configured to insert into the slide rail, said locking element configured so that rotation of said arm portion rotates said transverse member within a sliding channel of the slide rail between an unlocked position allowing releasable securement from the slide rail and a locked position for securing said storage box to the slide rail.

2. A cargo storage box in accordance with claim 1 wherein at least one of said cargo storage box retaining walls comprises a wheel well pass through channel.

3. A cargo storage box in accordance with claim 2 wherein two of said cargo storage box retaining walls comprise a wheel well pass through channel.

4. A cargo storage box in accordance with claim 1 wherein said distance between said base wall and each said retaining wall top surface is less than the distance between the cargo bed support surface and the top surfaces of the first and second cargo bed walls.

5. A cargo storage box in accordance with claim 1 wherein said locking element further comprises a base plate mounted on one of said retaining walls, said arm portion movably coupled to said base plate.

6. A cargo storage box in accordance with claim 5 wherein said arm portion is rotatably coupled to said base plate.

7. A cargo storage box in accordance with claim 5 wherein said arm portion is slidably engaged to said base plate.

8. A cargo storage box in accordance with claim 1 further comprising at least one substantially C-shaped slide rail defining a sliding channel, said slide rail adapted to be coupled to one of the bed walls and configured to engage said arm portion outer end.

9. A cargo storage box in accordance with claim 8 wherein said arm portion outer end, in said unlocked position, is removable from said substantially C-shaped slide rail at substantially any position along said substantially C-shaped slide rail.

10. A cargo storage box in accordance with claim 8 comprising:

said at least one locking element comprising a first locking element and a second locking element;

said at least one substantially C-shaped slide rail comprising, a first substantially C-shaped slide rail adapted to be coupled to the first bed wall, and a second substantially C-shaped slide rail adapted to be coupled to the second bed wall; and wherein said first substantially C-shaped slide rail is configured to engage said arm portion outer end of said first locking element and said second substantially C-shaped slide rail is configured to engage said arm portion outer end of said second locking element.

11. A cargo storage box in accordance with claim 1 further comprising at least one pair of wheels mounted on said base wall of said cargo storage box.

12. A cargo storage box in accordance with claim 1 further comprising at least one handle attached to said cargo storage box.

13. A cargo storage box in accordance with claim 1 wherein said cargo storage box is removable from the cargo bed of the pickup truck.

\* \* \* \* \*